(12) United States Patent
Zhang et al.

(10) Patent No.: US 10,313,401 B2
(45) Date of Patent: Jun. 4, 2019

(54) METHOD AND APPARATUS FOR SHARING CONTENT CONSUMPTION SESSIONS AT DIFFERENT DEVICES

(71) Applicant: Nokia Technologies Oy, Espoo (FI)

(72) Inventors: Liang Zhang, Beijing (FI); Yuanyuan Cui, Beijing (CN)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 14/914,351

(22) PCT Filed: Aug. 28, 2013

(86) PCT No.: PCT/CN2013/082471
§ 371 (c)(1),
(2) Date: Feb. 25, 2016

(87) PCT Pub. No.: WO2015/027413
PCT Pub. Date: Mar. 5, 2015

(65) Prior Publication Data
US 2016/0212178 A1    Jul. 21, 2016

(51) Int. Cl.
*H04L 29/08* (2006.01)
*H04L 29/06* (2006.01)
(Continued)

(52) U.S. Cl.
CPC ......... *H04L 65/1066* (2013.01); *G06Q 30/06* (2013.01); *H04L 65/403* (2013.01);
(Continued)

(58) Field of Classification Search
CPC .......... G06F 17/30879; G06F 17/0016; G06Q 30/0271; G06Q 30/02; H04L 51/36;
(Continued)

(56) References Cited

U.S. PATENT DOCUMENTS

| 9,640,001 B1* | 5/2017 | Vazquez | G07C 9/00007 |
| 2012/0072271 A1* | 3/2012 | Dessert | G06Q 30/02 705/14.1 |

(Continued)

FOREIGN PATENT DOCUMENTS

| CN | 101039197 A | 9/2007 |
| CN | 101261670 A | 9/2008 |

(Continued)

OTHER PUBLICATIONS

International Search Report and Written Opinion received for corresponding Patent Cooperation Treaty Application No. PCT/CN20131082471, dated Jun. 3, 2014, 18 pages.

*Primary Examiner* — Le H Luu
(74) *Attorney, Agent, or Firm* — Ditthavong & Steiner, P.C.

(57) ABSTRACT

An approach is provided for a more efficient and user friendly mechanism for sharing, transferring, or continuing a content consumption session via another device. The approach includes a method for determining a request to share a content consumption session from at least one device associated with a user to at least one other device associated with the user. The method further includes causing, at least in part, a generation of data describing at least one state of the content consumption session. The method also includes causing, at least in part, a transfer of the data to the at least one other device. Additionally, the method includes causing, at least in part, a mapping of the at least one device, the at least one other device, or a combination thereof to the user based, at least in part, on another request to continue the content consumption session at the at least one other device using the data.

20 Claims, 15 Drawing Sheets

(51) Int. Cl.
*H04N 21/41* (2011.01)
*H04N 21/8547* (2011.01)
*G06Q 30/06* (2012.01)

(52) U.S. Cl.
CPC ...... *H04L 65/4015* (2013.01); *H04L 67/1095* (2013.01); *H04N 21/4126* (2013.01); *H04N 21/8547* (2013.01)

(58) Field of Classification Search
CPC ... H04L 67/1095; H04L 67/20; H04L 9/3231; H04L 65/1066; H04L 65/403; H04L 65/4015; H04N 7/15; H04N 7/147; H04N 21/4126; H04N 21/8547; H04W 12/06; G07C 9/00007
See application file for complete search history.

(56) References Cited

U.S. PATENT DOCUMENTS

| | | | |
|---|---|---|---|
| 2012/0198531 A1* | 8/2012 | Ort | H04W 12/06 726/7 |
| 2013/0032634 A1* | 2/2013 | McKirdy | G06Q 30/0271 235/375 |
| 2013/0055406 A1* | 2/2013 | West | H04L 67/20 726/26 |
| 2013/0321554 A1* | 12/2013 | Martinsen | H04N 7/147 348/14.02 |
| 2013/0344853 A1* | 12/2013 | Lee | G06F 17/30879 455/414.1 |
| 2014/0012905 A1* | 1/2014 | Roche | H04L 51/36 709/204 |
| 2014/0028784 A1* | 1/2014 | Deyerle | H04N 7/15 348/14.08 |
| 2014/0247278 A1* | 9/2014 | Samara | G06K 17/0016 345/633 |
| 2014/0339296 A1* | 11/2014 | McAdams | G06F 17/30879 235/375 |
| 2015/0248468 A1* | 9/2015 | Cheng | H04L 67/1095 707/621 |
| 2016/0063313 A1* | 3/2016 | Sandholm | H04L 9/3231 382/118 |

FOREIGN PATENT DOCUMENTS

| | | |
|---|---|---|
| CN | 102577309 A | 7/2012 |
| CN | 103080930 A | 5/2013 |

* cited by examiner

METHOD AND APPARATUS FOR SHARING CONTENT CONSUMPTION SESSIONS AT DIFFERENT DEVICES

RELATED APPLICATION

This application was originally filed as Patent Cooperation Treaty Application No. PCT/CN2013/082471 filed Aug. 28, 2013.

BACKGROUND

Service providers (e.g., wireless, cellular, etc.) and device manufacturers are continually challenged to deliver value and convenience to consumers by, for example, providing compelling network services. One area of rapid development has been services and applications related to accessing and consuming content (e.g., music, video, electronic books, files, documents, etc.) on various user devices where some users may utilize a plurality of user devices to access and consume a content item at different times and at different locations. For example, a user may need to or decide to continue consumption of a content item on a different user device as he may have to move away from the original user device that was used to initiate the content consumption. However, if a user decides to switch user devices (e.g., from a personal computer to a tablet) while consuming a content item, he may need to restart the content consumption on the next user device, which could cause a loss of time (e.g., restart content consumption) and a non-optimal user experience (e.g., cannot remember the content consumption progress). Therefore, service providers and device manufactures face significant technical challenges to enable users to efficiently switch and continue content consumption from one device onto another device.

Some Example Embodiments

Therefore, there is a need for a more efficient and user friendly mechanism to share, transfer, or continue content consumption via another device.

According to one embodiment, a method comprises determining a request to share a content consumption session from at least one device associated with a user to at least one other device associated with the user. The method further comprises causing, at least in part, a generation of data describing at least one state of the content consumption session. The method also comprises causing, at least in part, a transfer of the data to the at least one other device. Additionally, the method comprises causing, at least in part, a mapping of the at least one device, the at least one other device, or a combination thereof to the user based, at least in part, on another request to continue the content consumption session at the at least one other device using the data.

According to another embodiment, an apparatus comprises at least one processor, and at least one memory including computer program code, the at least one memory and the computer program code configured to, with the at least one processor, cause, at least in part, the apparatus to determine a request to share a content consumption session from at least one device associated with a user to at least one other device associated with the user. The apparatus is also caused to cause, at least in part, a generation of data describing at least one state of the content consumption session. The apparatus is further caused to cause, at least in part, a transfer of the data to the at least one other device. Additionally, the apparatus is caused to cause, at least in part, a mapping of the at least one device, the at least one other device, or a combination thereof to the user based, at least in part, on another request to continue the content consumption session at the at least one other device using the data.

According to another embodiment, a computer-readable storage medium carries one or more sequences of one or more instructions which, when executed by one or more processors, cause, at least in part, an apparatus to determine a request to share a content consumption session from at least one device associated with a user to at least one other device associated with the user. The apparatus is also caused to cause, at least in part, a generation of data describing at least one state of the content consumption session. The apparatus is further caused to cause, at least in part, a transfer of the data to the at least one other device. Additionally, the apparatus is caused to cause, at least in part, a mapping of the at least one device, the at least one other device, or a combination thereof to the user based, at least in part, on another request to continue the content consumption session at the at least one other device using the data.

According to another embodiment, an apparatus comprises means for determining a request to share a content consumption session from at least one device associated with a user to at least one other device associated with the user. The apparatus further comprises means for causing, at least in part, a generation of data describing at least one state of the content consumption session. The apparatus also comprises means for causing, at least in part, a transfer of the data to the at least one other device. Additionally, the apparatus comprises means for causing, at least in part, a mapping of the at least one device, the at least one other device, or a combination thereof to the user based, at least in part, on another request to continue the content consumption session at the at least one other device using the data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-36 and 60-62.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for a more efficient and user friendly mechanism to share, transfer, or continue a content consumption session via another device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

It is noted that different embodiments and examples may refer to sharing, transferring, or continuing a content access and/or a content consumption session via one or more devices; however, the terms sharing, transferring, and continuing are utilized to describe various mechanisms for accessing and consuming contents and content consumption sessions via different devices, which may be at a same or different times and by a same or different users.

Figure 1:
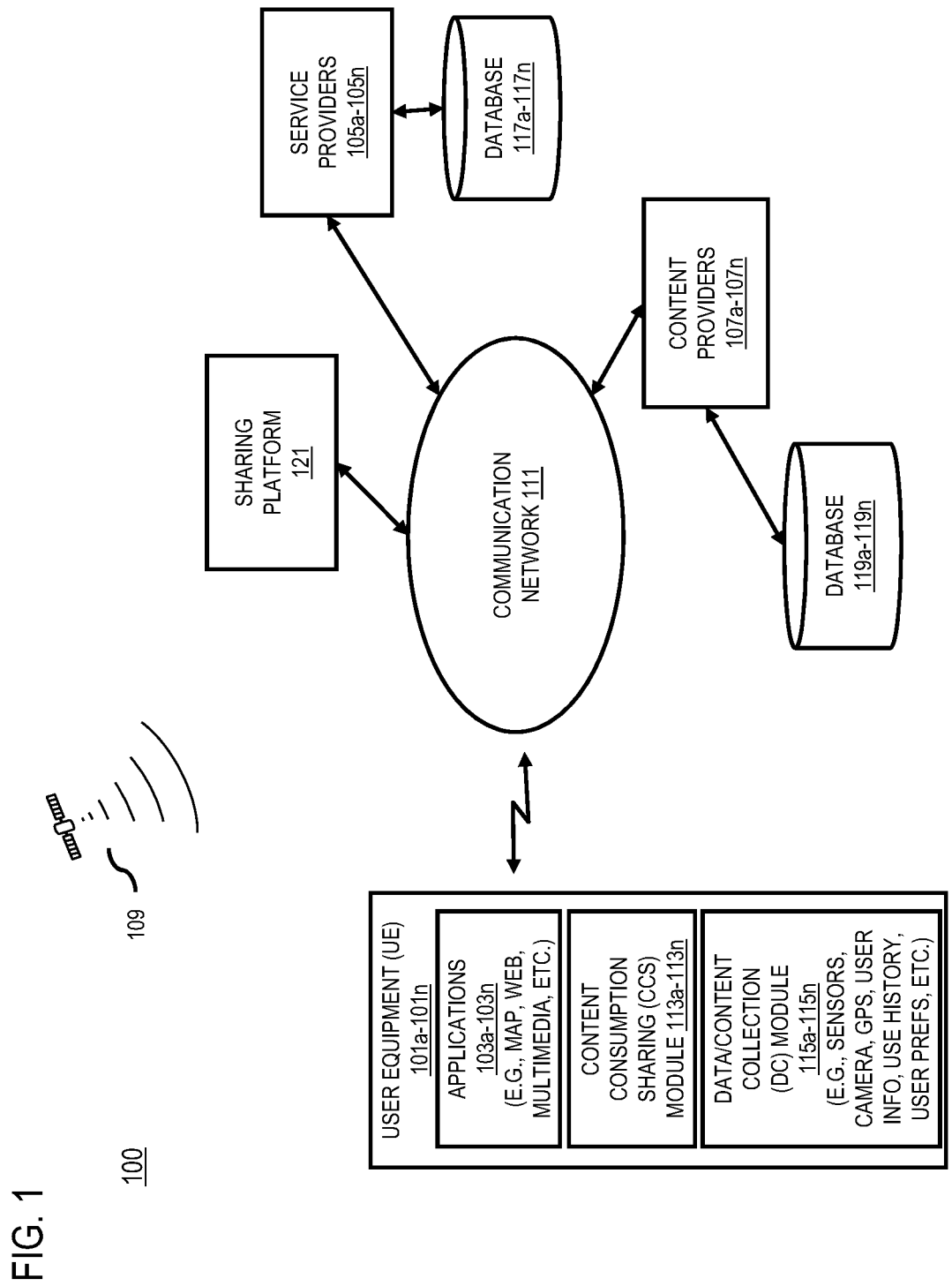
FIG. 1 is a diagram of a system capable of providing for a more efficient and user friendly mechanism to share, transfer, or continue a content consumption session via another device, according to an embodiment.

FIG. 1 is a diagram of a system capable of providing for a more efficient and user friendly mechanism to share, transfer, or continue a content consumption session via another device, according to an embodiment. Generally, users may utilize a plurality of user devices for performing various personal or professional tasks throughout the day which may be, for example, at home, at school, at a workplace, etc. For example, a user may use a laptop computer to access and consume a content item (e.g., read a news article/research paper, watch a video) available via a service/content provider web site. Then, in one instance, the user may wish or need to continue the consumption (e.g., reading, interacting, etc.) of the content item at a different device as he may be moving away from the device that he originally used to access and consume the content item. For example, the user may be consuming/interacting with a content item via his office computer, but now is leaving the office and the office computer; however, he wishes/needs to utilize a second user device (e.g., a tablet, a mobile phone, a laptop computer, etc.) to continue interacting/consuming the content item. Some solutions may include transferring the content item to the second user device and continue the consumption/interaction with the content item there, or use the second device to access, consume, and interact with the content item via a web site. However, transferring contents between devices and having duplicates would be an inefficient use of user time and resources at the devices (e.g., storage space, bandwidth, transfer time, login again, etc.) Further, these and similar solutions could cause a discontinuity between the content consumption sessions via the different devices where a user may not know/remember the consumption progress, user interface settings, or other information associated with each session at each device. For instance, a user may be watching a video clip at a first device and pauses the progress at some point before the clip is finished, but if the user uses a second device to access and continue watching the same video clip, the progress information and settings for the session on the first device will not be necessarily transferred/communicated to the session at the second device. Therefore, service providers face significant challenges in providing a more efficient and user friendly mechanism to continue content access and consumption via another device.

To address, at least these problems, a system 100 of FIG. 1 introduces the capability of a more efficient and user friendly mechanism to share, transfer, or continue a content consumption session via another device. More specifically, users in different settings may wish to utilize a simple process to quickly share or transfer a content consumption session (e.g., pictures, videos, audio, documents, game applications, etc.) from one device to one or more other devices, where the process may include few simple steps without necessarily having to perform all of the traditional steps of logging in to a particular service site or transferring of the content item in the session. In one use case scenario, a user may be consuming/interacting with the content item at a first user device and before the consumption of the content item is completed, the user may wish or need to continue consuming the content item at another user device. In one use case scenario, the user may wish to share the content consumption session with another user where that other user may continue consuming the content item from the same point where the user had paused consumption of the content item at the first device. In one embodiment, a user may initiate a sharing of a content consumption session via one or more options available at an application which may be utilized in consuming/interfacing with the content item. For example, the user may be watching a video clip at a first user device and then the user may select an option in a media player application and/or a browser application to indicate that the user wishes to transfer the content consumption session to another device, where in the session at the other device will include information associated with the settings, consumption progress, or other information associated with the content item and user preferences associated with that session. In one instance, particular information associated with device and application settings may be transferred from one device to the next device where the original device settings may be translated and converted to settings which may be appropriate for the next device.

In one embodiment, the process for sharing the content consumption session may be initiated and completed at a first device. For example, the content consumption session information may be transferred from the first device to one or more other devices via one or more communication channels (e.g., proximity-based communications) available among the devices. In one embodiment, a user of a first device may initiate a request for sharing the content consumption session, wherein a service provider may perform various steps for effectuating the sharing/transferring the content consumption session to another device. In one use case scenario, a user may identify and associate a plurality of devices with each other and/or with the user. For example, a user may be utilizing a first device where one or more applications may be utilized to identify and associate one or more other devices with the first device and with the user. In one scenario, information of the association of the devices (e.g., with each other, with the user, etc.) may be stored at one or more devices, one or more applications, or more service providers, or the like. In various embodiments, a request and information associated with a sharing/transferring of the consumption of a content item at a first device may be transferred to one or more other devices via a graphical code or an electronic message. For example, the graphical code may be generated at the first device where the second device may capture an image of the graphical code, wherein the graphical code may be processed by the second device or it can be transmitted (e.g., by the first device or by the second device) to a service/content provider for processing. In one example, an electronic message including various information items may be transmitted to the second device (e.g., via the first device, via a service provider, etc.) where the second device may process the electronic message/information for effectuating the sharing/transferring of the content consumption session to the second device. In one example, a graphical code may include various barcodes, images, markers, etc. (e.g., a quick response (QR) code), which may include encoded information associated with the content consumption session. In one embodiment, the first device may partially or completely generate the marker (e.g., a QR code) where the marker is displayed at the first device. In another example, an electronic message may include a text message, an email, and instant message, etc., which may include the information for initiating the sharing/transferring and content consumption session at the second device. In one embodiment, the second device may be utilized to scan (e.g., via an onboard camera) a marker displayed at the first device, whereby the scanning may initiate a request from the second device and/or from the first device to a service provider to transfer the content consumption from the first device to the second device.

In one embodiment, the system 100 determines a request to share a content consumption session from at least one device associated with a user to at least one other device associated with the user. In one embodiment, a service provider may receive a request from a first user device for initiating a sharing of a content consumption session at the first user device with a second user device. For example, a user of the first user device may be watching a video clip via the first user device and then decide to continue watching the video clip via a second user device. In one embodiment, the user may initiate the request via one or more user interface (UI) options available via one or more applications at a user device. For example, the UI options may be available in a media player, a web browser, a document reader/viewer, or the like. In one embodiment, at least one content item in the content consumption session is stored at the at least one device, at a server, or a combination thereof.

In one embodiment, the system 100 causes, at least in part, a generation of data describing at least one state of the content consumption session. In one embodiment, a service provider may determine and generate the data for describing various information and states associated with a content consumption session at a user device. In one embodiment, the data may be generated by one or more applications at the device which may be generating the request for sharing of the content consumption session. In one embodiment, the data includes information associated with the content consumption session, parameters for presentation of the content consumption session, at least one content item, the at least one device, the at least one other device, a session identification, a valid time duration for availability of the content consumption session, or a combination thereof. For example, the data may indicate the content item being consumed, the type of content item, location of the content item, a progress point in the consumption session, various device and/or application settings/preferences associated with the content consumption session, user information/preferences, or the like. In one embodiment, the data may include contextual data to indicate that the content item in the session may be for private use, may not be shared, may be shared with certain other users, file size may be too large for transfer/presentation via a given method, and the like.

In one embodiment, the system 100 causes, at least in part, a transfer of the data to the at least one other device. In one embodiment, a service provider may transfer the data to another device, whereat a user may continue the content consumption session at some point. In one embodiment, a user of a first user device may cause the data transfer to another device.

In one embodiment, the system 100 causes, at least in part, a mapping of the at least one device, the at least one other device, or a combination thereof to the user based, at least in part, on another request to continue the content consumption session at the at least one other device using the data. In one embodiment, a service provider may associate one or more user devices to a user where the user devices may be utilized to share content consumption sessions among devices. In one embodiment, a user may utilize various application options at a first device to associate one or more other devices with the first device and/or with the user. In one use case scenario, a user may initiate sharing of a content consumption session at a first device with a second device where the user may identify the second device which he may use for continuing the content consumption session at. In one use case scenario, once the user requests and initiates the content consumption session at the second device, then a service provider may associate the second device with the user and with one or more other devices which may be associated with the user.

In one embodiment, the system 100 processes and/or facilitates a processing of the data to cause, at least in part, a generation of at least one code, wherein the transfer of the data to the at least one other device is via the at least one code. In one embodiment, one or more applications at a first device may process the data and generate a code for sharing a content consumption session with a second device. In one embodiment, a service provider may process the data and generate a code for sharing a content consumption session with a second device. In another embodiment, a second device may process the data and generate a code for sharing a content consumption session with a second device. In one embodiment, the at least one code is a visual code that is transferable via an optical sensor. In one scenario, the first device may generate a visual code and a camera on the second device may be utilized to capture an image of that code for transferring to the second device for processing. In one embodiment, the visual code includes a one dimensional graphical code, a two dimensional graphical code, or a combination thereof. In one embodiment, a first device displays a graphical code and a second device scans and/or captures an image of the graphical code, for example, via a barcode scanner and/or via a camera device on the second device. In one embodiment, one or more components of the system 100 (e.g., a service provider, a service platform, etc.) may receive a scanned/captured graphical code from the second device. In one embodiment, the graphical code may be partially or completely decoded by the second device, for example, one or more applications on the second device may decode one or more portions of the graphical code and submit the decoded data to the one or more components of the system 100. In one instance, the second device may decode a graphical code and utilize the decoded data to perform one or more actions, for example, contact a certain service provider or connect to a certain network resource (e.g., a network server at a certain IP address), use an internet browser to connect to a certain website, and the like. In one embodiment, a content item may be stored at the first device, at a server, or a combination thereof. In one embodiment, a service provider may transfer to and/or present at the second device, the content item which the first device intended to share with the second device. In one embodiment, a service provider may request the content item from the first device to directly transfer to and/or present at the second device. In one embodiment, the service provider may request for and store the content item at the service provider before transferring to and/or presentation at the second device.

In one embodiment, the system 100 causes, at least in part, a presentation of a user interface at the least one device, at the at least one other device, or a combination thereof. In one embodiment, once a user initiates a request for sharing a content consumption session at a first device with a second device, then a service provider may cause a presentation of a UI where the user may select from one or more options for effectuating the request. In one embodiment, the service provider may cause the presentation of the UI on the second device where the user may select from one or more options for effectuating the sharing of the content consumption session via the second device. In various embodiments, one or more applications on the first device and/or on the second device may present the UI on either device for effectuating the sharing of the content consumption session.

In one embodiment, the system 100 determines one or more inputs at the least one device, at the at least one other device, or a combination thereof. In one embodiment, a service provider may receive one or more inputs from one or more applications via a first device and/or a second device which may be utilized for sharing of a content consumption session.

In one embodiment, the system 100 causes, at least in part, the generation of the code based, at least in part, on the one or more inputs. In one embodiment, a service provider may generate the code associated with sharing of a content consumption session at a first user device with a second user device.

In one embodiment, the system 100 processes and/or facilitates a processing of the data to cause, at least in part, a generation of at least one communication message, wherein the transfer of the data to the at least one other device is via the at least one communication message. In one embodiment, a service provider may generate a communication message to a second device for transferring the data associated with sharing of a content consumption session at a first device. In various embodiments, the at least one communication message is an electronic mail message, a text message, an instant message, or a combination thereof.

In one embodiment, the system 100 determines if there is a valid access to the content consumption session from the at least one other device within a valid threshold duration. In one embodiment, a user and/or a service provider may set a time duration during which a user may utilize a second device to accept and continue the content consumption session shared by a first device. For example, a service provider may wish to limit the time duration in order to efficiently manage and utilize its resources. In another example, a user may wish to limit at the time duration for sharing the content consumption session with another device to avoid having multiple pending content consumption sessions offered to a plurality of other devices.

In one embodiment, the system 100 causes, at least in part, a tracking of one or more interactions with the content consumption session via the at least one other device. In one embodiment, a service provider may monitor interactions of a user with a content consumption session at a device so that progress and any changes to the content consumption session may be tracked and associated with that session. For example, the tracking information may indicate that a user has completed reading of a document on a second device, or it may indicate that the user has changed certain parameters and settings associated with the presentation of that document.

In one embodiment, the system 100 determines a consumption progress information associated with a content consumption session via the at least one device, the at least one other device, or a combination thereof. In one embodiment, one or more applications at a user may determine content consumption progress information at a device. For example, a media player on a second device may determine the progress information on start and stop points during a video playback session at the second device.

In one embodiment, the system 100 causes, at least in part, a generation of another data based, at least in part, on the consumption progress information. In various scenarios, a content consumption session may be at a device which may not be in communication with a service provider, or that the content being consumed at the device may be directly stored at the device. Further, the device may determine that consumption progress information so that it may be communicated to the service provider.

In one embodiment, the system 100 causes, at least in part, an update to a server including the consumption progress information. In one embodiment, a first device or a second device may update a service provider with the consumption progress information associated with a content consumption session. For example, a first device may determine the consumption progress information associated with a content consumption session at the first device and provide that information to the service provider, and later a second device may determine the consumption progress information associated with a content consumption session at the second device and provide that information to the service provider. A service provider may utilize the update information to determine and provide a total consumption progress information to the user devices which may be sharing a content consumption session.

In various embodiments, one or more users may utilize capabilities and benefits of the system 100 to easily share content consumption sessions with one or more other users, wherein the process is simple, efficient, user-friendly, and conducive to sharing or continuing a content consumption session via a different device, wherein the request and initiation of the sharing may be via a service provider or among different devices.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, content sharing, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), a sharing platform 121 (see discussion in FIG. 3), and/or with other components of the system 100 directly and/or via communication network 111. In one embodiment, the UEs 101 may include content consumption sharing modules 113a-113n (also collectively referred to as the CCS module 113.) In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the CCS module 113 and a camera module may be utilized to scan, capture, process, submit, analyze, append, etc. encoded data (e.g., graphical) representations for sharing various content consumption sessions; for example, viewing videos, listening to audio recordings, reading documents, and the like. In various embodiments, the CCS module 113 may include various components for capturing various representations of graphical codes (e.g., barcodes) scanner where the graphical codes may include various types of one dimensional and two dimensional codes. For example, the barcodes may include encoded linear bars, stacked bars, in color code, quick response (QR) code, matrix format code, in various orientations, and the like, wherein the graphical codes may be standardized. In one embodiment, the CCS module 113 may include various predefined parameters and configuration information associated with a user, a user device, one or more service/content providers, and the like. In one embodiment, the CCS module 113 may present one or more options for a user to select one or more content consumption sessions from a list of sessions available at user device for sharing. Further, the CCS module 113 may cause a transmission of one or more requests for sharing one or more content consumption sessions to one or more service providers 105 and/or content providers 107, which may generate one or more encoded data representations (e.g., a barcode, a QR code, alphanumeric codes, etc.) In one embodiment, the CCS module 113 at the first device may generate the one or more encoded data representations, which may contain one or more information items associated with the one or more content items, the one or more service providers 105, the one or more content providers 107, and/or the sharing platform 121. In one embodiment, a user may utilize a second device to scan and/or capture an image of an encoded data representation for causing a request for one or more content consumption session to be transferred to and/or presented at the second device.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like. In one embodiment, a service provider 105 may receive and process a request/input from a user for establishing a content channel wherein one or more users may share content items among the users. In one embodiment, the service provider 105 may utilize various algorithms, software applications, modules, hardware, firmware, and the like for processing, recognizing, detecting, comparing, and the like content items (e.g., media items) that may be associated with a content channel and use a processed content item for authenticating one or more users wishing to access the content channel if the users submit substantially same content item as a key for accessing the content channel.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, and the sharing platform 121 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the service providers 105 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
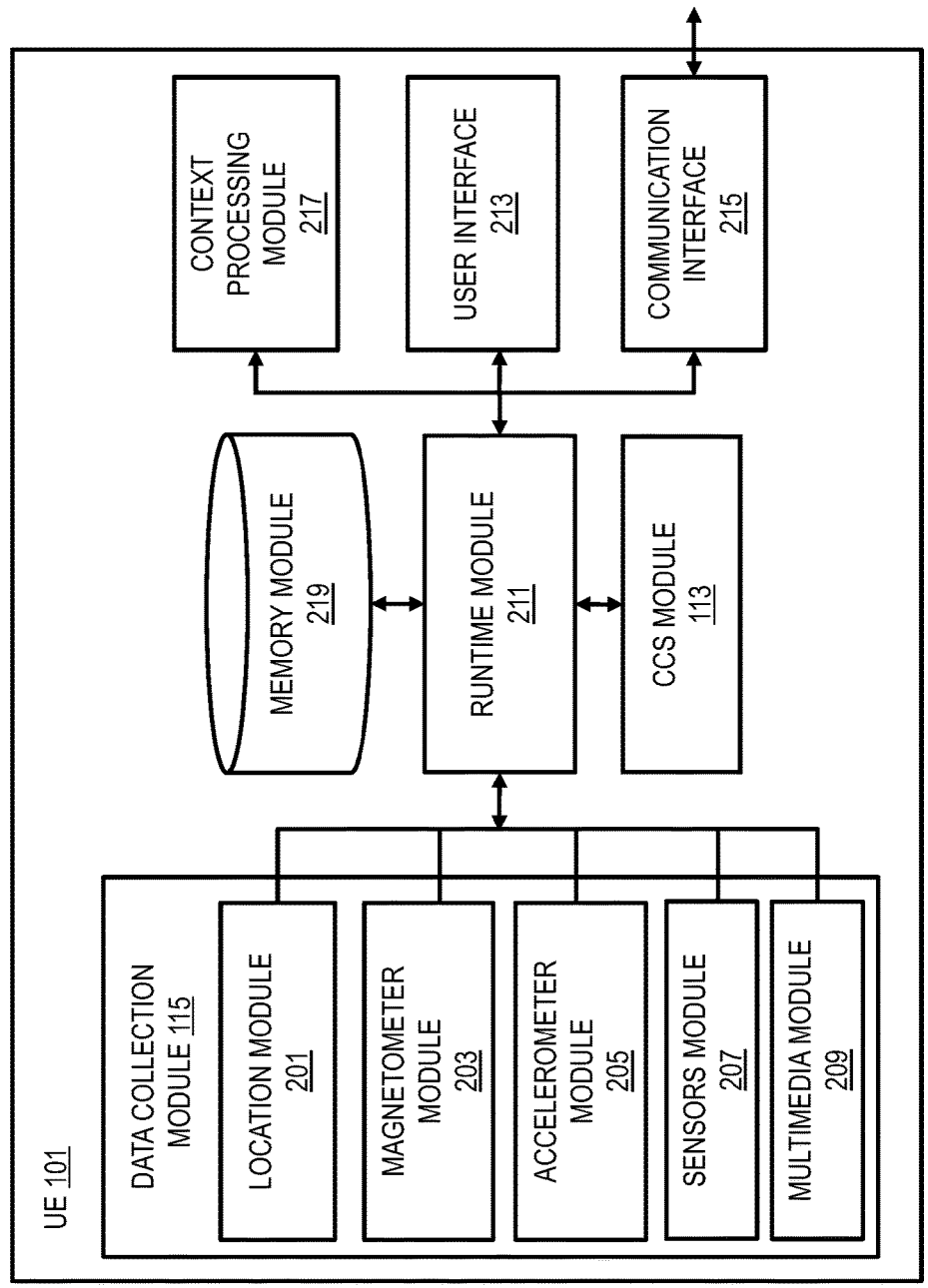
FIG. 2 is a diagram of components of a user equipment capable of content consumption session sharing, according to an embodiment.

FIG. 2 is a diagram of the components of a user equipment capable of content consumption session sharing, according to an embodiment. By way of example, a UE 101 includes one or more components for receiving, generating, capturing, and/or scanning of an encoded data representation for sharing one or more content items from a first device to one or more other devices. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, the CCS module 113, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, graphical encoded data representations, images, video, audio, and the like, wherein the captured media may be submitted to one or more modules and applications of the UE 101, a service provider, and/or a content provider to further processing, storage, sharing, and the like. For example, a captured image of a graphical encoded data representations may be submitted to a service provider and/or the context processing module 217 for analysis and/or decoding. In one embodiment, the multimedia module 209 may also be utilized to scan a graphical encoded data representation, which may be associated with one or more content items for sharing via one or more local and/or remote service providers.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the CCS module 113, DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

In various embodiments, the runtime module may cause one or more modules/components of a UE 101 to associate one or more available data items with one or more content consumption sessions at a UE 101. For example, date, time, location, and user information associated with a device at a particular time may be associated (e.g., as metadata) with a content consumption sessions.

Figure 3:
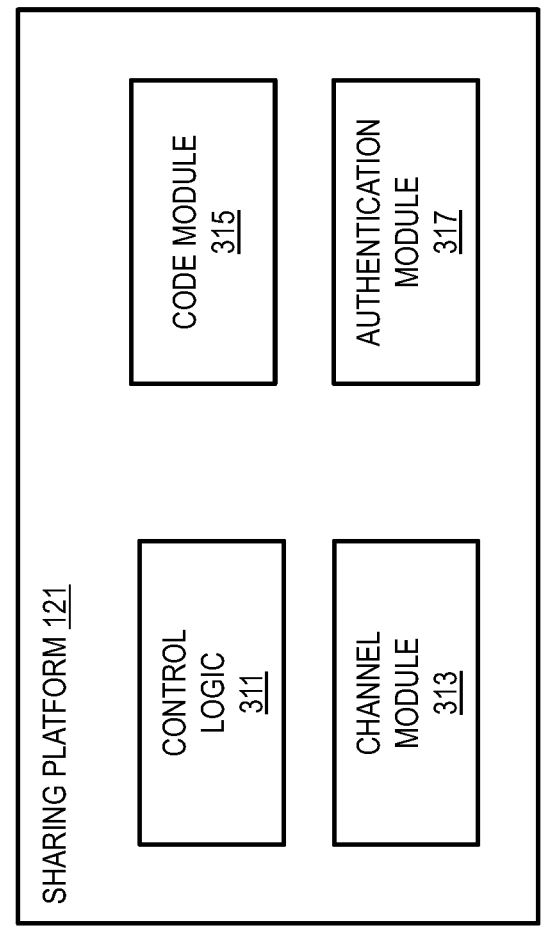
FIG. 3 is a diagram of components of a sharing platform, according to an embodiment.

FIG. 3 is a diagram of the components of the sharing platform, according to an embodiment. By way of example, the sharing platform 121 includes one or more components for facilitating sharing of one or more content consumption sessions among a plurality of devices in the system 100. It is contemplated that the functions of these components may be combined in one or more components or performed by other components of equivalent functionality. In this embodiment, the sharing platform 121 includes a control logic 311, channel module 313, code module 315, and an authentication module 317. In one embodiment, the control logic 311 and channel module 313 may manage one or more content channels at one or more service providers, content providers, servers, and the like. As previously discussed, a content channel may be established and utilized for effectuating sharing of content consumption sessions among a plurality of user devices. In one embodiment, an encoded data representation may be utilized to effectuate the sharing of the one or more content consumption sessions. In one embodiment, a user may utilize an application and/or a module wherein configuration information of a content channel, a content consumption session, user information, user preferences, and the like may be predefined. Alternatively, the sharing platform 121 may determine all or partial configuration information based on available resources at the system 100.

In one embodiment, the control logic 311 and the channel module 313 may receive a request/input from a user for sharing one or more content consumption sessions among user devices, wherein the channel module 313 may determine one or more parameters associated with the user preferences, user history, content type for sharing, a service provider, and the like. Further, the channel module 313 may utilize a predefined dedicated content channel or may determine a suitable channel based, at least in part, on the determined parameters and information.

In one embodiment, the control logic 311 and the code module 315 may cause a generation and/or a decoding of one or more encoded data representations associated with one or more content consumption sessions. In one embodiment, the code module 315 may generate an encoded data representation for sharing at a device. For example, the code module 315 may process a request from a first device for sharing one or more content consumption sessions available for sharing and further generate one or more encoded data representations for the one or more content consumption sessions. In one embodiment, the one or more encoded data representations are transmitted to the first device (e.g., a device wishing to share one or more content consumption sessions.) In one embodiment, the code module 315 may decode an encoded data representation (e.g., received from a second device), which may be associated with one or more content consumption sessions available at a device (e.g., a first device) for sharing. For example, the code module 315 may receive an encoded data representation from a second device, which may be requesting to access a content consumption session associated with the encoded data representation. In one embodiment, the one or more content consumption sessions be shared may be available at a first device, at a service provider, at a local storage, at a remote storage, and the like.

In one embodiment, the control logic 311 and authentication module 317 may cause an authentication of users/devices for access to a content consumption session. For example, the control logic 311 and the authentication module 317 may process an encoded data representation, which is to be a key for accessing one or more content consumption sessions. In one embodiment, the authentication module 317 may utilize one or more algorithms, software applications, modules, and the like for decoding an encoded data representation associated with one or more content consumption sessions to be shared among a plurality of devices. For example, the encoded data representation may be a QR code, which may be associated with a content consumption session available at a first device, wherein the content consumption session is to be transferred/shared to a second device.

Figure 4:
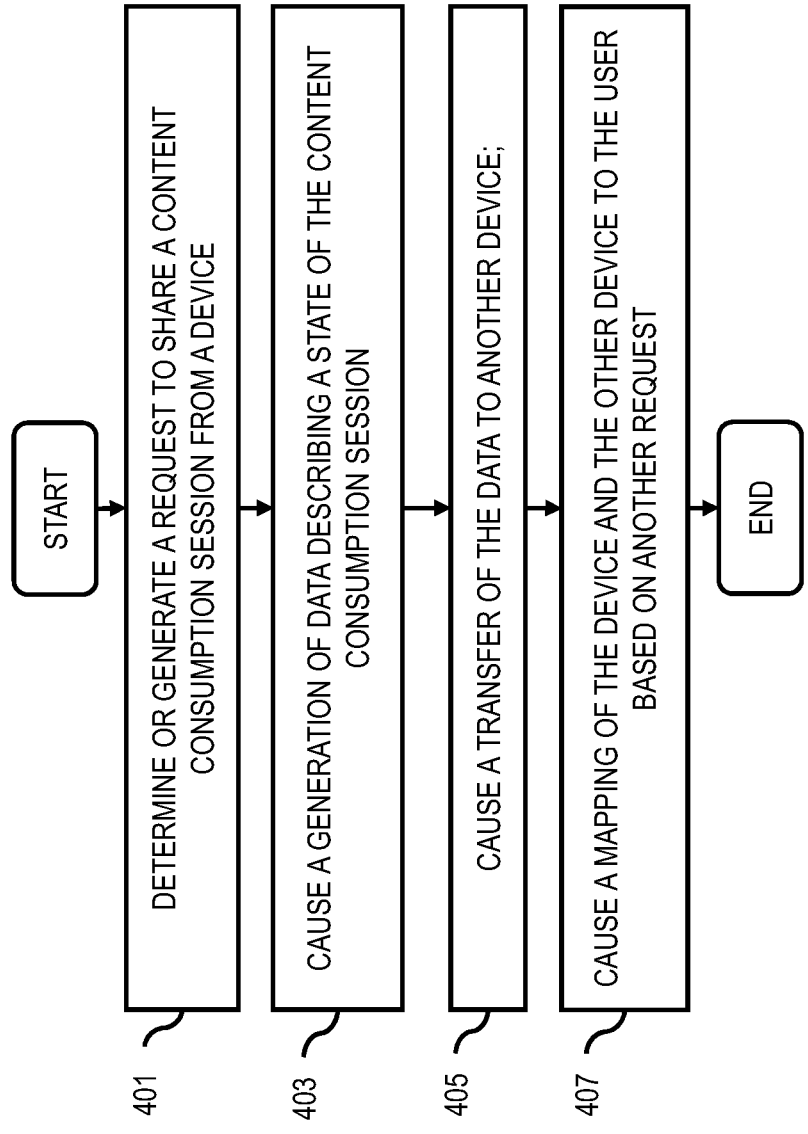
FIGS. 4 through 6 illustrate flowcharts of various processes for, at least, sharing one or more content consumption sessions, according to various embodiments.
Figure 5:
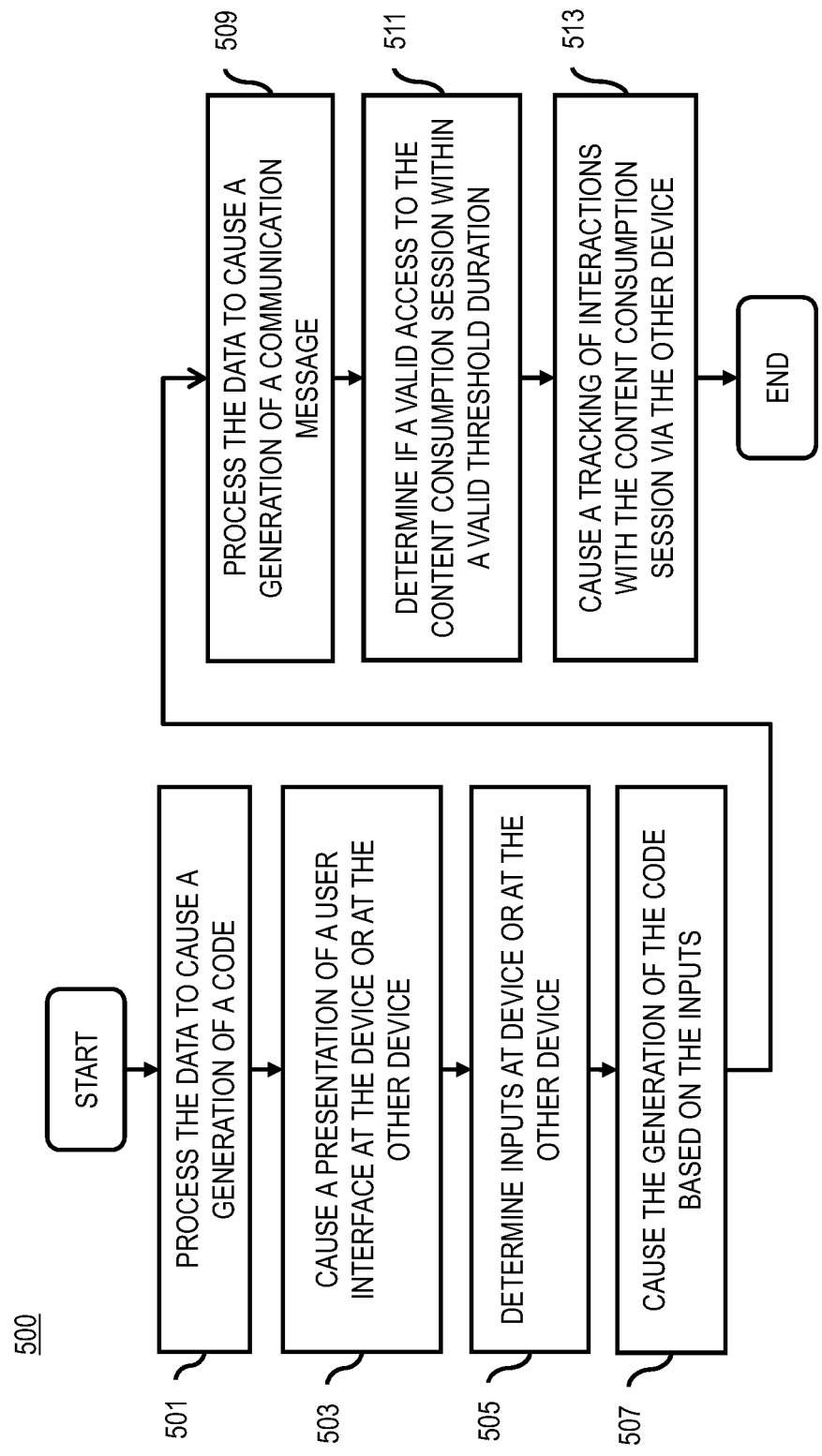
Figure 6:
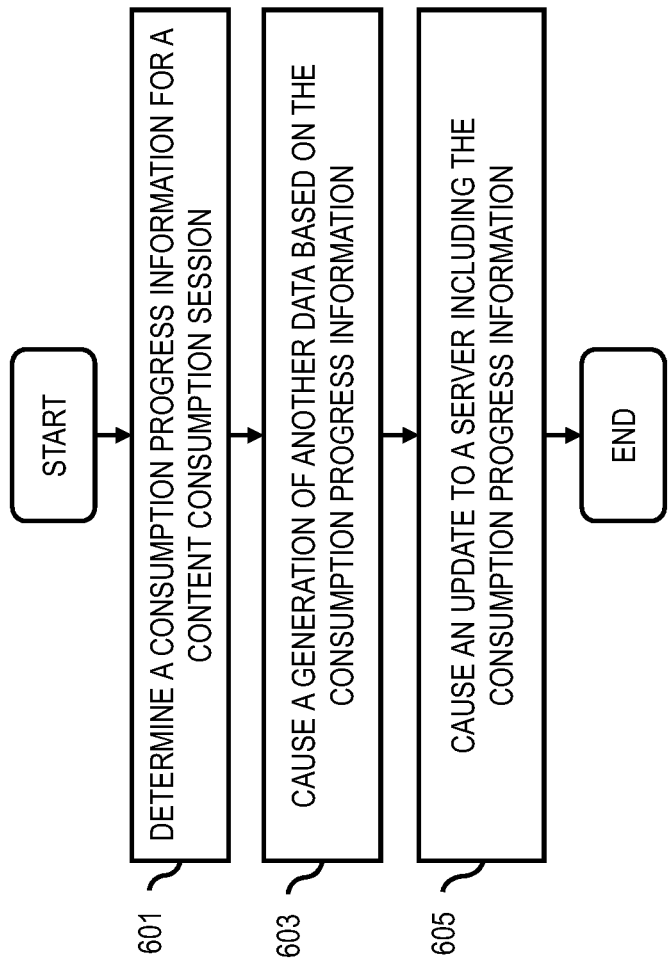
Figure 9:
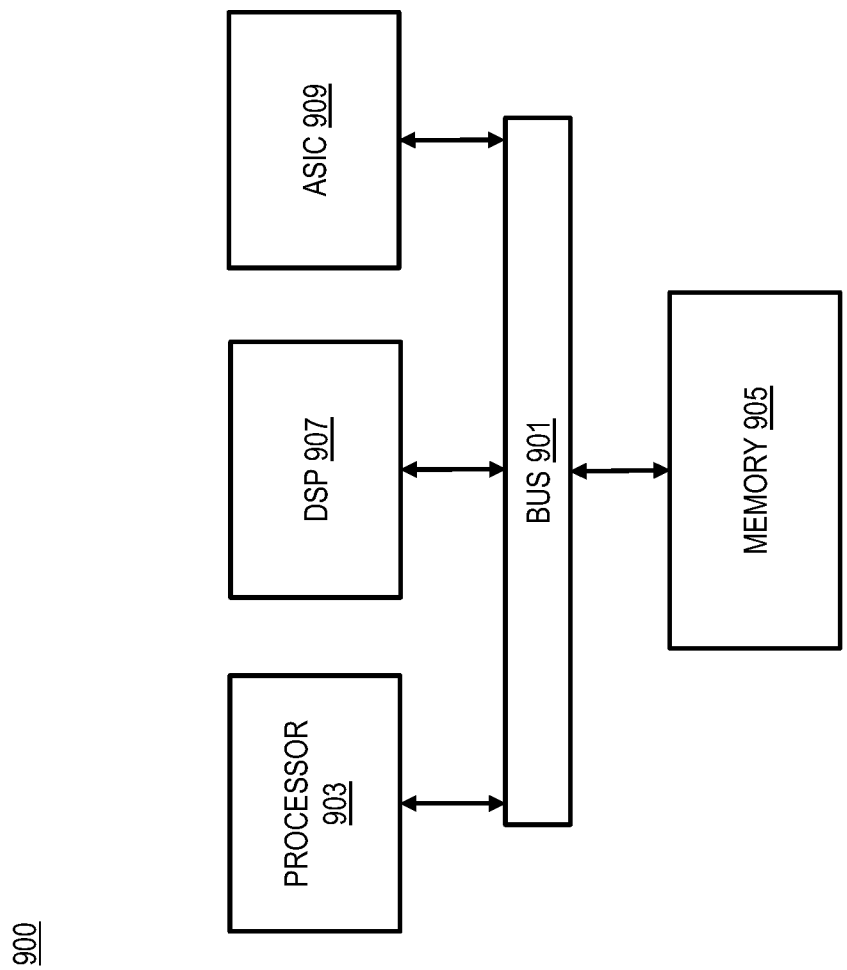
FIG. 9 is a diagram of a chip set that can be used to implement an embodiment of the invention.

FIGS. 4 through 6 illustrate flowcharts of various processes for, at least, sharing one or more content consumption sessions, according to various embodiments. In various embodiments, a the sharing platform 121 and/or the CCS module 113 may perform processes 400, 500, and 600 that may be implemented in, for instance, a chip set including a processor and a memory as shown in FIG. 9. As such, the sharing platform 121 and the CCS module 113 can provide means for accomplishing various parts of the process 400, 500, and 600 as well as means for accomplishing other processes in conjunction with other components of the system 100. Throughout this process, the sharing platform 121 and the CCS module 113 may be referred to as completing various portions of the processes 400, 500, and 600; however, it is understood that other components of the system 100 can perform some of and/or all of the process steps. Further, in various embodiments, the sharing platform 121 and/or the CCS module 113 may be implemented in one or more entities of the system 100.

Referring to FIG. 4, the process 400 begins at step 401 where the sharing platform 121 and/or the CCS module 113 may determine a request to share a content consumption session from at least one device associated with a user to at least one other device associated with the user. In one embodiment, a service provider may receive a request from a first user device for initiating a sharing of a content consumption session at the first user device with a second user device. For example, a user of the first user device may be watching a video clip via the first user device and then decide to continue watching the video clip via a second user device. In one embodiment, the user may initiate the request via one or more user interface (UI) options available via one or more applications at a user device. For example, the UI options may be available in a media player, a web browser, a document reader/viewer, or the like. In one embodiment, at least one content item in the content consumption session is stored at the at least one device, at a server, or a combination thereof.

In step 403, the sharing platform 121 and/or the CCS module 113 may cause, at least in part, a generation of data describing at least one state of the content consumption session. In one embodiment, a service provider may determine and generate the data for describing various information and states associated with a content consumption session at a user device. In one embodiment, the data may be generated by one or more applications at the device which may be generating the request for sharing of the content consumption session. In one embodiment, the data includes information associated with the content consumption session, parameters for presentation of the content consumption session, at least one content item, the at least one device, the at least one other device, a session identification, a valid time duration for availability of the content consumption session, or a combination thereof. For example, the data may indicate the content item being consumed, the type of content item, location of the content item, a progress point in the consumption session, various device and/or application settings/preferences associated with the content consumption session, user information/preferences, or the like. In one embodiment, the data may include contextual data to indicate that the content item in the session may be for private use, may not be shared, may be shared with certain other users, file size may be too large for transfer/presentation via a given method, and the like.

In step 405, the sharing platform 121 and/or the CCS module 113 may cause, at least in part, a transfer of the data to the at least one other device. In one embodiment, a service provider may transfer the data to another device, whereat a user may continue the content consumption session at some point. In one embodiment, a user of a first user device may cause the data transfer to another device.

In step 407, the sharing platform 121 and/or the CCS module 113 may cause, at least in part, a mapping of the at least one device, the at least one other device, or a combination thereof to the user based, at least in part, on another request to continue the content consumption session at the at least one other device using the data. In one embodiment, a service provider may associate one or more user devices to a user where the user devices may be utilized to share content consumption sessions among devices. In one embodiment, a user may utilize various application options at a first device to associate one or more other devices with the first device and/or with the user. In one use case scenario, a user may initiate sharing of a content consumption session at a first device with a second device where the user may identify the second device which he may use for continuing the content consumption session at. In one use case scenario, once the user requests and initiates the content consumption session at the second device, then a service provider may associate the second device with the user and with one or more other devices which may be associated with the user.

Referring to FIG. 5, the process 500 begins at step 501 where the sharing platform 121 and/or the CCS module 113 may process and/or facilitate a processing of the data to cause, at least in part, a generation of at least one code, wherein the transfer of the data to the at least one other device is via the at least one code. In one embodiment, one or more applications at a first device may process the data and generate a code for sharing a content consumption session with a second device. In one embodiment, a service provider may process the data and generate a code for sharing a content consumption session with a second device.

In another embodiment, a second device may process the data and generate a code for sharing a content consumption session with a second device. In one embodiment, the at least one code is a visual code that is transferable via an optical sensor. In one scenario, the first device may generate a visual code and a camera on the second device may be utilized to capture an image of that code for transferring to the second device for processing. In one embodiment, the visual code includes a one dimensional graphical code, a two dimensional graphical code, or a combination thereof. In one embodiment, a first device displays a graphical code and a second device scans and/or captures an image of the graphical code, for example, via a barcode scanner and/or via a camera device on the second device. In one embodiment, one or more components of the system 100 (e.g., a service provider, a service platform, etc.) may receive a scanned/captured graphical code from the second device. In one embodiment, the graphical code may be partially or completely decoded by the second device, for example, one or more applications on the second device may decode one or more portions of the graphical code and submit the decoded data to the one or more components of the system 100. In one instance, the second device may decode a graphical code and utilize the decoded data to perform one or more actions, for example, contact a certain service provider or connect to a certain network resource (e.g., a network server at a certain IP address), use an internet browser to connect to a certain website, and the like. In one embodiment, a content item may be stored at the first device, at a server, or a combination thereof. In one embodiment, a service provider may transfer to and/or present at the second device, the content item which the first device intended to share with the second device. In one embodiment, a service provider may request the content item from the first device to directly transfer to and/or present at the second device. In one embodiment, the service provider may request for and store the content item at the service provider before transferring to and/or presentation at the second device.

In step 503, the sharing platform 121 and/or the CCS module 113 may cause, at least in part, a presentation of a user interface at the least one device, at the at least one other device, or a combination thereof. In one embodiment, once a user initiates a request for sharing a content consumption session at a first device with a second device, then a service provider may cause a presentation of a UI where the user may select from one or more options for effectuating the request. In one embodiment, the service provider may cause the presentation of the UI on the second device where the user may select from one or more options for effectuating the sharing of the content consumption session via the second device. In various embodiments, one or more applications on the first device and/or on the second device may present the UI on either device for effectuating the sharing of the content consumption session.

In step 505, the sharing platform 121 and/or the CCS module 113 may determine one or more inputs at the least one device, at the at least one other device, or a combination thereof. In one embodiment, a service provider may receive one or more inputs from one or more applications via a first device and/or a second device which may be utilized for sharing of a content consumption session.

In step 507, the sharing platform 121 and/or the CCS module 113 may cause, at least in part, the generation of the code based, at least in part, on the one or more inputs. In one embodiment, a service provider may generate the code associated with sharing of a content consumption session at a first user device with a second user device.

In step 509, the sharing platform 121 and/or the CCS module 113 may process and/or facilitate a processing of the data to cause, at least in part, a generation of at least one communication message, wherein the transfer of the data to the at least one other device is via the at least one communication message. In one embodiment, a service provider may generate a communication message to a second device for transferring the data associated with sharing of a content consumption session at a first device. In various embodiments, the at least one communication message is an electronic mail message, a text message, an instant message, or a combination thereof.

In step 511, the sharing platform 121 and/or the CCS module 113 may determine if there is a valid access to the content consumption session from the at least one other device within a valid threshold duration. In one embodiment, a user and/or a service provider may set a time duration during which a user may utilize a second device to accept and continue the content consumption session shared by a first device. For example, a service provider may wish to limit the time duration in order to efficiently manage and utilize its resources. In another example, a user may wish to limit at the time duration for sharing the content consumption session with another device to avoid having multiple pending content consumption sessions offered to a plurality of other devices.

In step 513, the sharing platform 121 and/or the CCS module 113 may cause, at least in part, a tracking of one or more interactions with the content consumption session via the at least one other device. In one embodiment, a service provider may monitor interactions of a user with a content consumption session at a device so that progress and any changes to the content consumption session may be tracked and associated with that session. For example, the tracking information may indicate that a user has completed reading of a document on a second device, or it may indicate that the user has changed certain parameters and settings associated with the presentation of that document.

Referring to FIG. 6, the process 600 begins at step 601 where the CCS module 113 may determine a consumption progress information associated with a content consumption session via the at least one device, the at least one other device, or a combination thereof. In one embodiment, one or more applications at a user may determine content consumption progress information at a device. For example, a media player on a second device may determine the progress information on start and stop points during a video playback session at the second device.

In step 603, the CCS module 113 may cause, at least in part, a generation of another data based, at least in part, on the consumption progress information. In various scenarios, a content consumption session may be at a device which may not be in communication with a service provider, or that the content being consumed at the device may be directly stored at the device. Further, the device may determine that consumption progress information so that it may be communicated to the service provider.

In step 605, the CCS module 113 may cause, at least in part, an update to a server including the consumption progress information. In one embodiment, a first device or a second device may update a service provider with the consumption progress information associated with a content consumption session. For example, a first device may determine the consumption progress information associated with a content consumption session at the first device and provide that information to the service provider, and later a second device may determine the consumption progress information associated with a content consumption session at the second device and provide that information to the service provider. A service provider may utilize the update information to determine and provide a total consumption progress information to the user devices which may be sharing a content consumption session.

FIGS. 7A through 7F illustrate example UI diagrams utilized in the processes of the FIGS. 4 through 6, according to various embodiments.

Figure 7A:
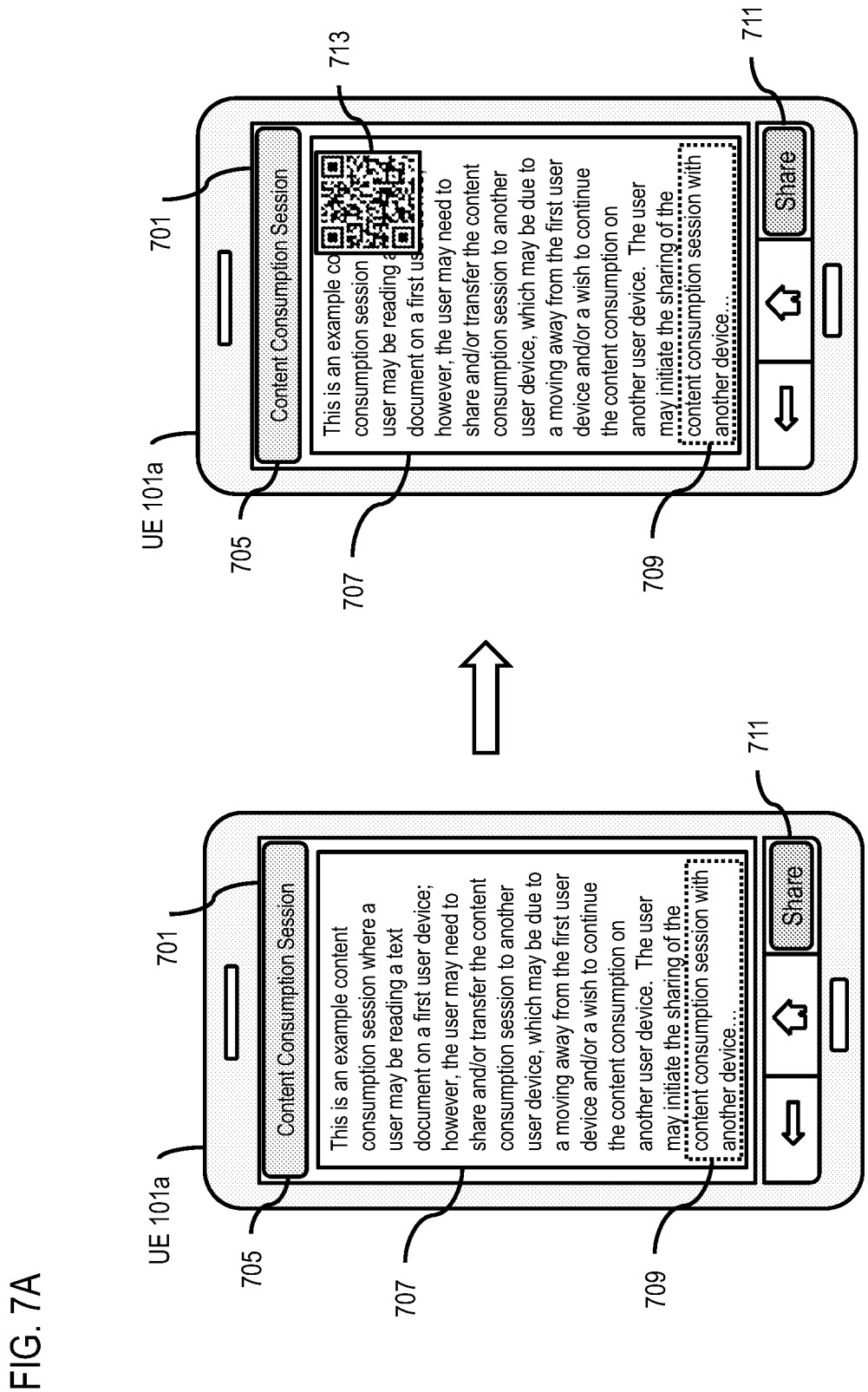
FIGS. 7A through 7F illustrate example user interface diagrams utilized in the processes of the FIGS. 4 through 6, according to various embodiments.
Figure 7B:
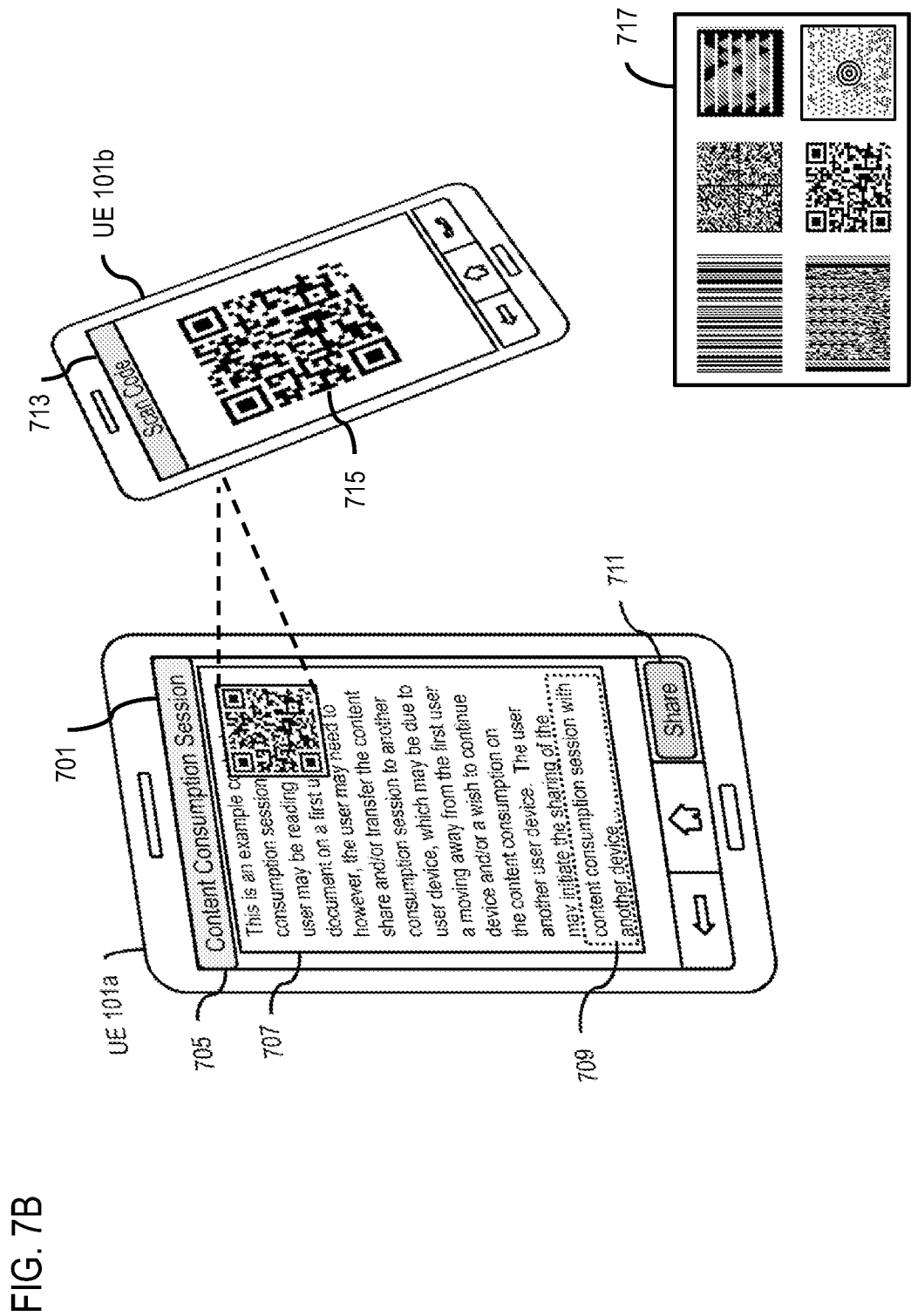

FIG. 7A includes example UI illustrations 701 on a UE 101a. As shown, in one embodiment, a user may utilize the UI 701 of the UE 101a to initiate a sharing of a content consumption session 705 of a content item 707 with another device. In one embodiment, the user of the UE 101a may mark a continuation/sharing point 709 in the content item 707, which he may wish to continue at on the other user device. For example, the point 709 may be anywhere in the content item and maybe determined by the user, by an application utilized to consume the content item, by a service/content provider, and the like. In one embodiment, the user may initiate a sharing/transfer of the content consumption session 705 via one or more UI options 711. In one scenario, the CCS 113 may generate one or more encoded data (e.g., graphical, alphanumeric, etc.), which may include various information for initiating the sharing/transferring of the content consumption session with/to another device. For example, one or more applications at the UE 101a may generate a bar code 713. Further, in FIG. 7B, a user may utilize UI 713 on a user device UE 101b to scan the barcode 715 (e.g., via a scanner, a camera, etc.) for initiating a continuation of the content consumption session from the UE 101a onto the UE 101b. In various examples, an encoded barcode may include one or more of the example barcodes 717 and/or other available barcodes. In one example, a barcode may include various information associated with the content item of the content consumption session, information associated with the user, location of the content item (e.g., at a service/content provider, at another UE 101, etc.), or the like. In one example, the UE 101b may decode all or a part of the information of an encoded data or it may forward the encoded data (e.g., barcode) to one or more service/content providers for further processing. In one embodiment, the UE 101a may transmit the decoded information to a service/content provider, which may provide the shared/transferred content consumption session at the UE 101b.

Figure 7C:
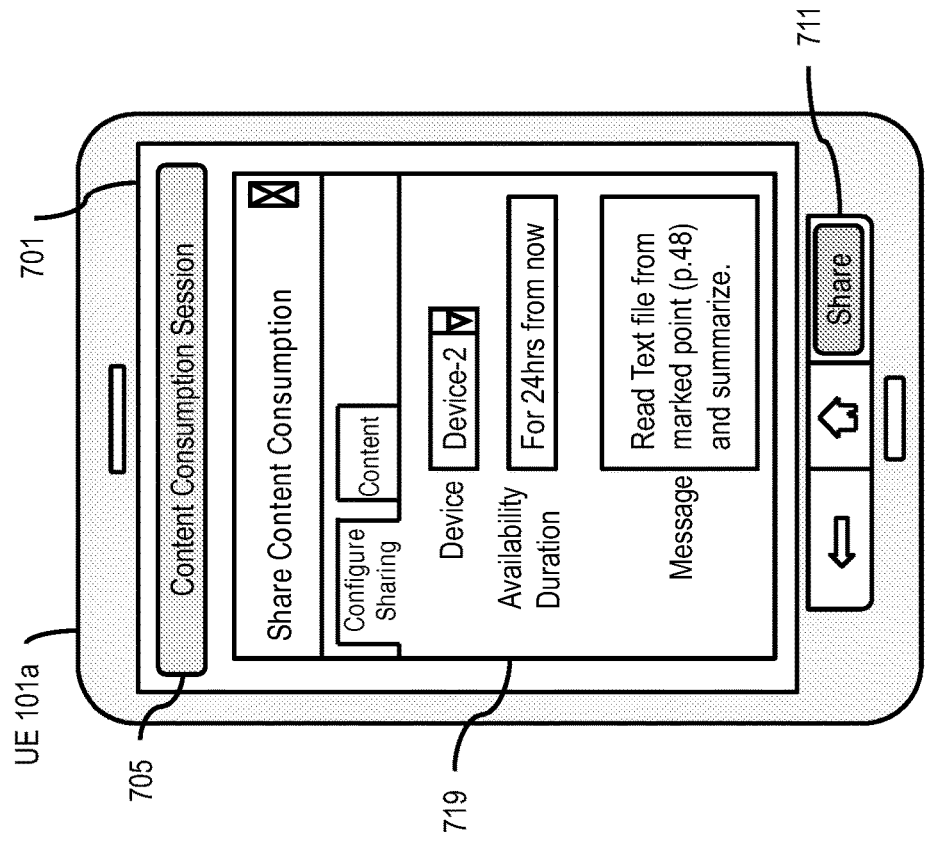

In FIG. 7C, UI 701 on the UE 101a illustrates UI template 719 on a first device, which a user may utilize for initiating a sharing/transferring of a content consumption session 705 with/to another device. In one embodiment, the template 719 may include various options for a user to configure the sharing/transferring, wherein the options may be based, at least in part, on the user information, content information, user device information, service/content provider information, or the like. In one example, the template 719 may include options for selecting a device which the content consumption session is to be shared with, availability duration of the content consumption session (e.g., for 24 hours from now), a message to be delivered with the content consumption session information, or the like. In various embodiments, the template 719 may be presented by the CCS module 113, the applications 103, a service/content provider, or the like, wherein the options presented may depend on a content type, an originating device type, a target device type, or the like.

Figure 7D:
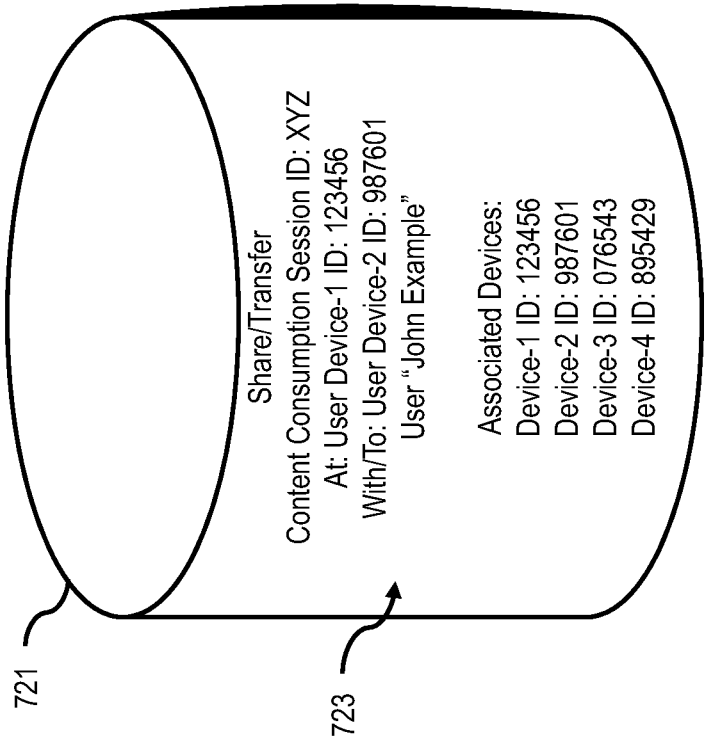

FIG. 7D illustrates a server 721 which may be part of the sharing platform 121 or a service/content provider for facilitating sharing/transferring of a content consumption session among a plurality of devices. In one example, information items 723 may be provided by a user device (e.g., UE 101a) or they may be determined by the sharing platform 121, wherein the information items 723 may include a content consumption session ID, a first user device ID requesting the sharing/transferring of the content consumption session, a second user device ID which is to receive the sharing/transferring of the content consumption session, user information associated with the first and second user devices, other user devices which may be associated with the user and/or with the first/second user devices. In one embodiment, a user may associate a plurality of user devices with each other and with the user. In one embodiment, a service/content provider, the sharing platform 121, or other elements of the system 100 may determine and cause the association on various user devices with a user. For example, the sharing platform 121 may associate a particular user device with a user upon the user utilizing that particular user device. In various scenarios, a list of user devices associated with a user may be updated by the user, by a UE 101, and/or by one or more elements of the system 100.

Figure 7E:
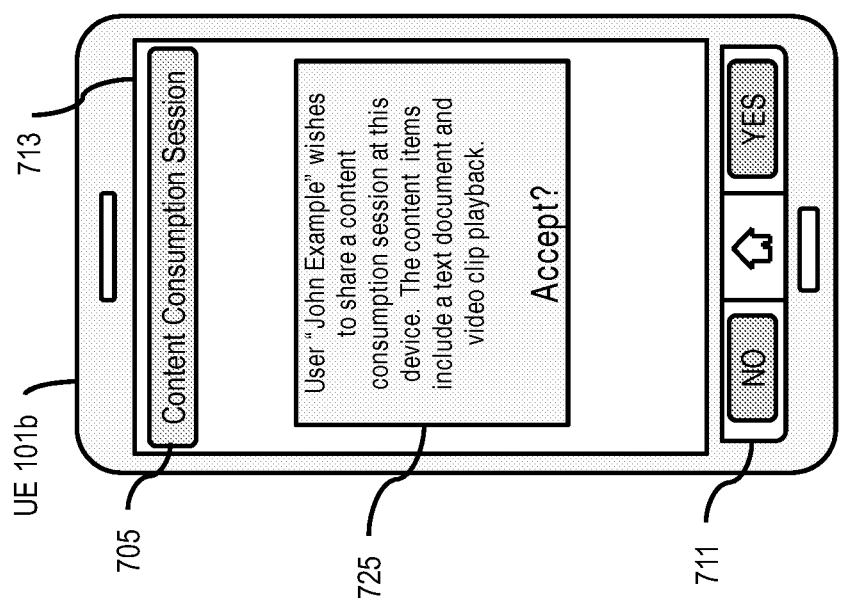

FIG. 7E includes UI 713 on a UE 101b showing a message 725 from a service/content provider or a UE 101a indicating that a user "John Example" has requested for sharing/transferring a content consumption session with/to the UE 101b where the content consumption session may include various content items, for example, textual, video, audio, etc. In one embodiment, a user may accept or reject the sharing/transferring via UI options 711 (e.g., Yes, No, etc.), wherein the acceptance/rejection information may be provided back to the UE 101a requesting the sharing/transferring.

Figure 7F:
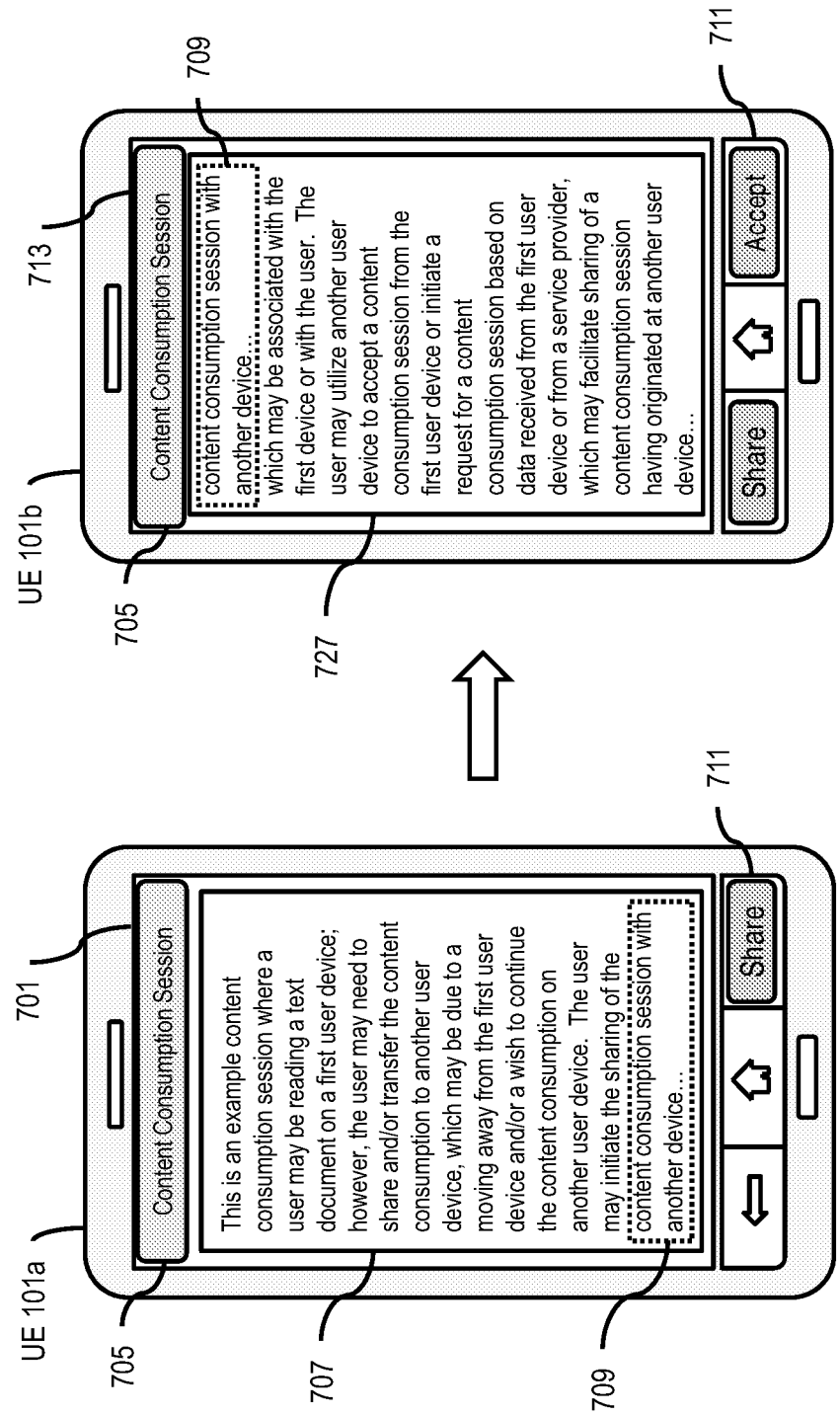

Referring to FIG. 7F, the content consumption session 707 from UE 101a may be continued at the UE 101b UI 713 as content consumption session 727, which may begin from the marked point 709 from the UE 101a. For example, a textual content item may include one or more marked sentences from the previous content consumption session at the UE 101a. In one example, the content consumption session at the UE 101a may have been of a video content item, which may continue a playback at the UE 101b substantially at the same point as it was paused/stopped at the UE 101a. In various embodiments, a content consumption session shared with one device may be furthered shared/transferred with/to one or more other devices. For example, if a UE 101a shares a content consumption session with a UE 101b, then the UE 101b may utilize UI options 711 to accept the sharing session from the UE 101a and/or the user of UE 101b may further decide to share the content consumption session 727 with another device (e.g., UE 101c, UE 101d, etc.) In one embodiment, a user may identify a content consumption session as private, public, work related, or the like so that the user or other users sharing the content consumption session may be able to control further sharing/transferring.

The processes described herein for a more efficient and user friendly mechanism for sharing a content consumption session with another device may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
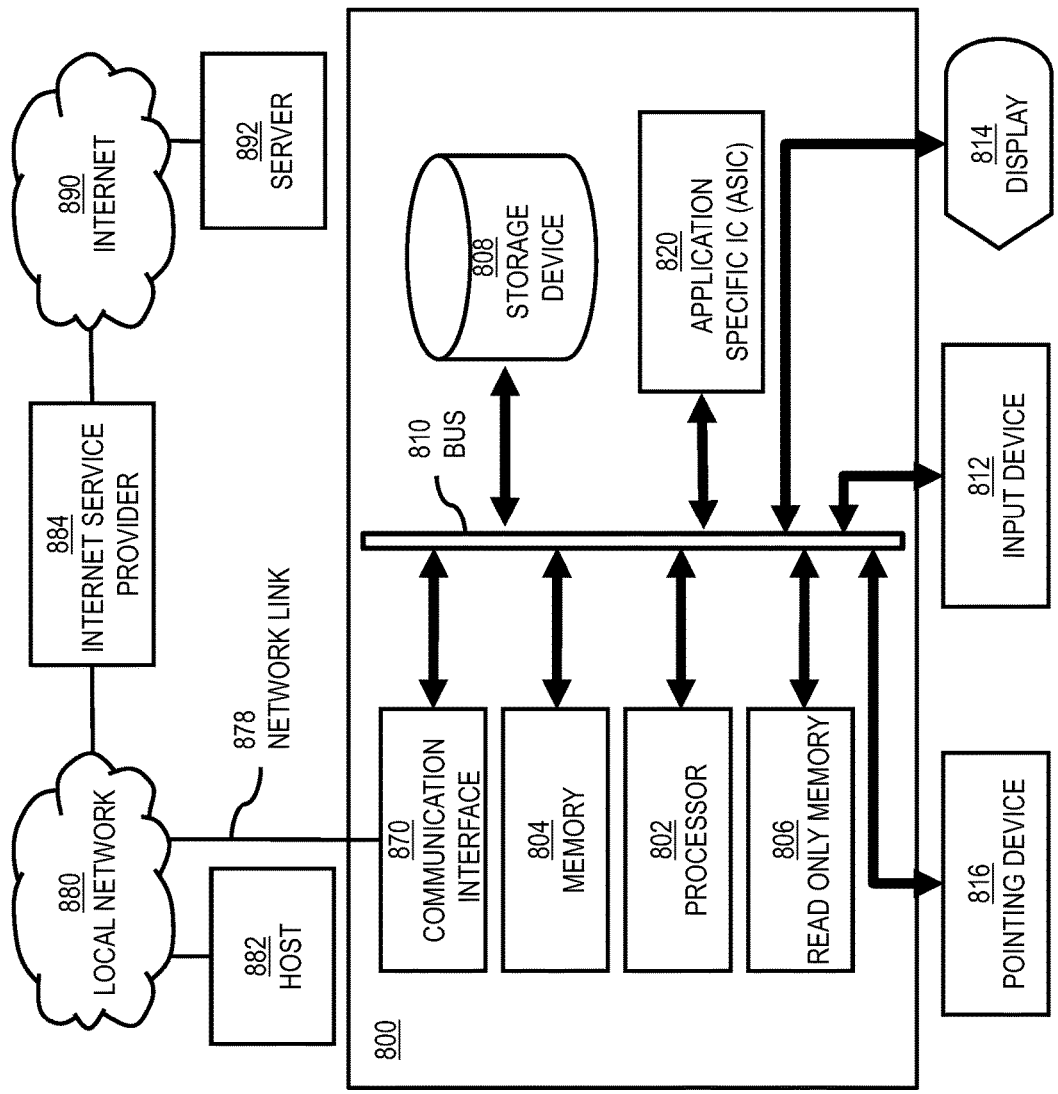
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to share a content consumption session with another device as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of sharing a content consumption session with another device.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to share a content consumption session with another device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for sharing a content consumption session with another device. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for sharing a content consumption session with another device, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for sharing a content consumption session with another device.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed sharing a content consumption session with another device as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of sharing a content consumption session with another device.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to share a content consumption session with another device. The memory 905 also stores the data associated with or generated by the execution of the inventive steps.

Figure 10:
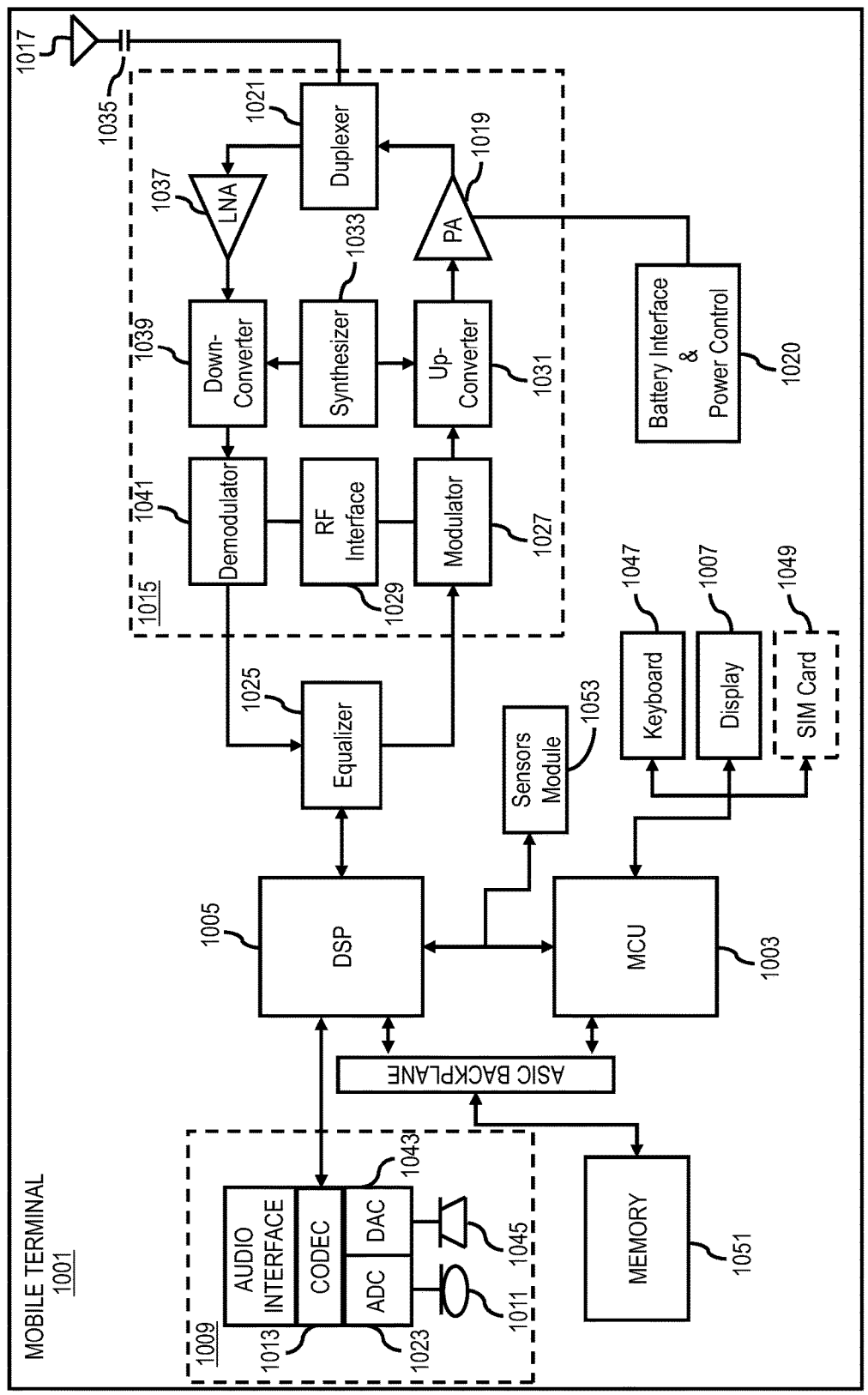
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of sharing a content consumption session with another device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of sharing a content consumption session with another device. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 for sharing a content consumption session with another device. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining a request to transfer a content consumption session from at least one device associated with a user to at least one other device associated with the user, wherein a content item of the content consumption session includes one or more audio recordings, one or more video recordings, one or more electronic books, one or more files, one or more electronic documents;
   generating, by the at least one device, a barcode describing at least one progress state and being encoded with a progress point of the content consumption session, wherein the bar code is not provided by a server;
   rendering a presentation of the barcode on a user interface of the at least one device or transferring the barcode to the at least one other device;
   initiating a mapping of the at least one device, the at least one other device, or a combination thereof to the user based, at least in part, on another request to continue the content consumption session from the progress point at the at least one other device using the barcode.

2. A method of claim 1, wherein the barcode is encoded with one or more marked texts, audio sessions, images, or a combination thereof of the progress point of the content consumption session paused on the at least one device and then started on the at least one other device.

3. A method of claim 2, further comprising:
   determining one or more user inputs at the least one device, at the at least one other device, or a combination thereof, wherein the barcode is generated based, at least in part, on the one or more inputs,
   wherein the barcode is further encoded with one or more device and/or application settings associated with the content consumption session, user information, one or more user preferences, or a combination thereof.

4. A method of claim 2, wherein the barcode is transferable via an optical sensor, and
   wherein the barcode is further encoded with contextual data indicating that the content item is for private use, not to be shared, to be shared with one or more predetermined users, or a combination thereof.

5. A method of claim 2, further comprising:
   processing the barcode to cause, at least in part, a generation of at least one communication message, wherein the transfer of the barcode to the at least one other device is via the at least one communication message.

6. A method of claim 5, wherein the at least one communication message is an electronic mail message, a text message, an instant message, or a combination thereof.

7. A method of claim 1, wherein the barcode is encoded with one or more marked texts, and the one or more marked texts include one or more marked sentences of the progress point in a content item of the content consumption session.

8. A method of claim 7, wherein the one or more marked texts are continued in the content consumption session via a web browser at the at least one other device while discontinued at the at least one device.

9. A method of claim 1, further comprising:
   determining if there is a valid access to the content consumption session from the at least one other device within a valid threshold duration; and
   initiating a tracking of one or more interactions with the content consumption session via the at least one other device.

10. A method of claim 1, wherein the barcode is further encoded with a location of the content item of the content consumption session, and the content item of the content consumption session is stored at another device different from the at least one device and the at least one other device, at a server, or a combination thereof.

11. A method of claim 1, wherein the barcode further includes information associated with the content consumption session, parameters for presentation of the content consumption session, at least one content item, the at least one device, the at least one other device, a session identification, a valid time duration for availability of the content consumption session, or a combination thereof.

12. An apparatus comprising:
    at least one processor; and
    at least one memory including computer program code for one or more programs,
    the at least one memory and the computer program code configured to, with the at least one processor, cause the apparatus embedded in at least one device associated with a user to perform at least the following,
    determine a request to transfer a content consumption session from the at least one device associated with a user to at least one other device associated with the user, wherein a content item of the content consumption session includes one or more audio recordings, one or more video recordings, one or more electronic books, one or more files, one or more electronic documents;
    generate a barcode describing at least one progress state and being encoded with a progress point of the content consumption session, wherein the bar code is not provided by a server;
    render a presentation of the barcode on a user interface of the at least one device or transfer the barcode to the at least one other device;

initiate a mapping of the at least one device, the at least one other device, or a combination thereof to the user based, at least in part, on another request to continue the content consumption session from the progress point at the at least one other device using the barcode.

13. An apparatus of claim 12, wherein the barcode is encoded with one or more marked texts, audio sessions, images, or a combination thereof of the progress point of the content consumption session paused on the at least one device and then started on the at least one other device.

14. An apparatus of claim 13, wherein the apparatus is further caused to:
determine one or more user inputs at the least one device, at the at least one other device, or a combination thereof, wherein the barcode is generated based, at least in part, on the one or more inputs.

15. An apparatus of claim 13, wherein the barcode is transferable via an optical sensor.

16. An apparatus of claim 13, wherein the apparatus is further caused to:
process the barcode to cause, at least in part, a generation of at least one communication message, wherein the transfer of the barcode to the at least one other device is via the at least one communication message.

17. An apparatus of claim 16, wherein the at least one communication message is an electronic mail message, a text message, an instant message, or a combination thereof.

18. An apparatus of claim 12, wherein the barcode is encoded with one or more marked texts, and the one or more marked texts include one or more marked sentences of the progress point in a content item of the content consumption session.

19. An apparatus of claim 12, wherein the apparatus is further caused to:
determine if there is a valid access to the content consumption session from the at least one other device within a valid threshold duration; and
initiate a tracking of one or more interactions with the content consumption session via the at least one other device.

20. An apparatus of claim 12, wherein the barcode further includes information associated with the content consumption session, parameters for presentation of the content consumption session, at least one content item, the at least one device, the at least one other device, a session identification, a valid time duration for availability of the content consumption session, or a combination thereof.

* * * * *